United States Patent [19]

Nagashima

[11] 4,428,835
[45] Jan. 31, 1984

[54] STRAINER

[75] Inventor: Akira Nagashima, Kawasaki, Japan

[73] Assignee: Kioritz Corporation, Tokyo, Japan

[21] Appl. No.: 394,396

[22] Filed: Jul. 1, 1982

[30] Foreign Application Priority Data

Jul. 8, 1981 [JP] Japan .......................... 56-100657[U]

[51] Int. Cl.³ ............................................ B01D 35/28
[52] U.S. Cl. .................... 210/172; 210/220; 210/416.4; 210/460
[58] Field of Search ...................... 210/172, 406, 416.1, 210/416.4, 416.5, 459, 460, 482, 242.1, 220, 484, 210/497.01

[56] References Cited

U.S. PATENT DOCUMENTS

| 195,423 | 9/1877 | Vent | 210/460 |
|---|---|---|---|
| 307,822 | 11/1884 | Weightman | 210/460 |
| 536,858 | 4/1895 | Donato | 210/242.1 |
| 2,754,003 | 7/1956 | Fenner | 210/460 |
| 2,916,147 | 12/1959 | Checke et al. | 210/460 |
| 3,744,640 | 7/1973 | Grover | 210/172 |

FOREIGN PATENT DOCUMENTS

| 47-3430 | 1/1972 | Japan | 210/416.1 |
|---|---|---|---|
| 5222174 | 6/1975 | Japan | 210/416.1 |

Primary Examiner—Charles N. Hart
Assistant Examiner—John W. Czaja
Attorney, Agent, or Firm—Karl W. Flocks; A. Fred Starobin; Sheridan Neimark

[57] ABSTRACT

A strainer for a liquid sucking device and adapted to be attached to the end of a flexible liquid sucking tube of the device. The strainer has an outlet tube adapted to be connected to the flexible liquid sucking tube of the device, a spherical shell integral with the outlet tube, a strainer element attached to the outer surface of the spherical shell and a weight accommodated by the internal cavity of the spherical shell.

1 Claim, 2 Drawing Figures

STRAINER

BACKGROUND OF THE INVENTION

The present invention relates to a strainer attached to the end of a flexible liquid sucking tube of a liquid sucking device such as a pump.

In the liquid sucking device, particularly in the device for sucking fuel or lubrication oil from a tank in a small-sized machine driven by internal combustion engine, a strainer is attached to the end of the sucking tube connected to the liquid sucking device, in order to prevent dusts or other foreign matters from being sucked together with the fuel or lubrication oil. The liquid sucking tube is usually flexible so that it may flex freely to keep the strainer in the best posture for sucking, regardless of the change in the posture of the machine mounting the engine.

Hitherto, the strainers of the kind described are made to have generally cylindrical forms which are quite impractical from the view points of treatment and design of the strainer element. In addition, the conventional cylidrical strainers require a large number of steps of production process and a high cost of production and, hence, are quite uneconomical although they are small in size.

SUMMARY OF THE INVENTION

Accordingly, it is a primary object of the invention to provide a simple and less-expensive strainer thereby to obviate the above-described problems of the prior art.

More specifically, the invention aims at providing an improved strainer capable of functioning well responding to the change in the posture of the machine while decreasing the tendency of attaching of the dusts or the like foreign matters thereto.

The invention aims also at increasing the self cleaning effect through enhancing the rolling contact between the strainer and the inner surface of the tank to improve the durability of the strainer.

The invention is intended also to facilitate the cleaning and renewal of the filter.

The invention further aims at reducing the material cost and production cost of the strainer.

To this end, according to the invention, there is provided a strainer comprising: an outlet tube adapted to be connected to a flexible liquid sucking tube of a liquid sucking device, a spherical shell integral with the outlet tube and having a cavity communicating with the outlet tube, a strainer element attached to the outer surface of the spherical shell, and a ball-like weight accomodated by the cavity in the shell.

The above and other objects, features and advantages of the invention will become clear from the following description of the preferred embodiment taken in conjunction with the accompanying drawings.

DESCRIPTION OF THE PREFERRED EMBODIMENT

Figure 1:
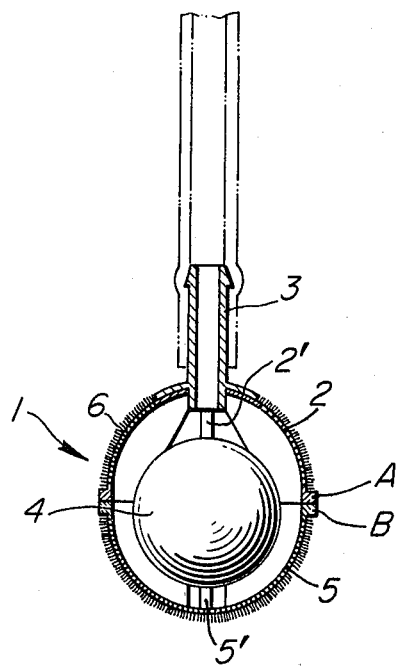
FIG. 1 is a vertical sectional view of a strainer in accordance with an embodiment of the invention.
Figure 2:
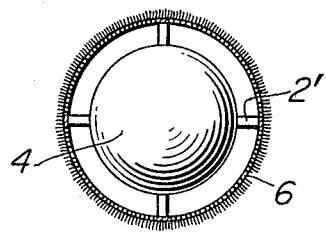
FIG. 2 is a cross-sectional view of the strainer shown in FIG. 1.

Referring to the drawings, a strainer in accordance with an embodiment of the invention, generally designated at a reference numeral 1, has a pair of hemispherical shell parts 2 and 5. An outlet tube 3, adapted to be connected to a flexible liquid sucking tube of a liquid sucking device, is integrally attached to one 2 of the hemispherical shell parts so as to communicate with the inside of the latter. The two hemisphercal shell parts 2 and 5 in cooperation define a cavity for receiving a metallic ball-like weight 4 such as of a steel. The ball-like weight 4 is supported by ribs 2' and 5'. After placing the ball-like weight 4, two hemispherical shell parts 2 and 5 are brought together and are jointed to each other at their joint surfaces A and B to form a spherical shell. Then, a strainer element 6 is attached to the outer surface of the spherical shell to complete the strainer 1.

The hemispherical shell parts 2 and 5 are made of a synthetic resin, while the strainer element 6 is preferably made of a synthetic resin although it may be formed by a metallic gauze wire. Although the spherical shell and the strainer element have small weights, the strainer 1 as a whole has a suitable weight because of the presence of the metallic ball-like weight 4 in the spherical shell. The strainer 1 as a whole, therefore, can take the optimum posture by flexing the liquid sucking tube, in response to the change in the posture of the machine.

The spherical form of the strainer 1 permits the strainer 1 to roll freely in contact with the inner surface of the tank in response to the change in the posture of the machine, to increase the frequency of the mutual contact between the strainer element 6 and the tank surface, which in turn enhances the dust removing effect for detaching the dusts or the like foreign matters from the strainer surface. The spherical form of the strainer 1 provides another advantage that the total surface area of the strainer 1 is increased as compared with the conventional strainers to enhance the liquid sucking capacity of the strainer while reducing the tendency of clogging due to attaching of dusts or the like foreign matters thereto. In consequence, the cleaning of the strainer is very much facilitated. The strainer of the invention, having the construction heretofore described, can be produced easily and at a low cost as compared with the conventional strainers having cylindrical forms.

Although the invention has been described through a specific embodiment, it is to be noted here that the described embodiment is not exclusive and various changes and modifications may be imparted thereto without departing from the scope of the invention which is limited solely by the appended claims.

What is claimed is:

1. A strainer comprising an outlet tube adapted to be connected to a flexible liquid sucking tube of a liquid sucking device; a perforated spherical shell integral with said outlet tube and having an internal cavity communicating with said liquid sucking tube; a strainer element attached to said spherical shell; and a ball-like weight disposed and supported by ribs in said cavity of said spherical shell.

* * * * *